(12) United States Patent
Pelegrin

(10) Patent No.: US 7,107,717 B2
(45) Date of Patent: Sep. 19, 2006

(54) LIGHTED FISHING LURE

(76) Inventor: Steven J Pelegrin, 1111 Stockman Rd., Grain Valley, MO (US) 64029

( * ) Notice: Subject to any disclaimer, the term of this patent is extended or adjusted under 35 U.S.C. 154(b) by 0 days.

(21) Appl. No.: 11/201,710

(22) Filed: Aug. 12, 2005

(65) Prior Publication Data

US 2006/0096152 A1    May 11, 2006

Related U.S. Application Data

(60) Provisional application No. 60/626,331, filed on Nov. 9, 2004.

(51) Int. Cl.
*A01K 85/01* (2006.01)
(52) U.S. Cl. .................. 43/17.6; 43/42.53; 43/42.24
(58) Field of Classification Search ........... 43/42.53, 43/17.6, 17.5, 42.24, 42.31
See application file for complete search history.

(56) References Cited

U.S. PATENT DOCUMENTS

| | | | |
|---|---|---|---|
| 479,194 A | 7/1892 | Mack | |
| 2,718,033 A * | 9/1955 | Burke | 43/42.53 |
| 2,718,668 A * | 9/1955 | Burke | 43/42.53 |
| 2,757,475 A * | 8/1956 | Pankove | 43/42.31 |
| 2,990,497 A * | 6/1961 | Rugg | 523/400 |
| 3,213,562 A * | 10/1965 | Salvin et al. | 43/17.6 |
| 3,308,569 A | 3/1967 | Foellner | |
| 3,449,641 A * | 6/1969 | Lee | 264/272.17 |
| 3,528,816 A * | 9/1970 | Nagae | 43/42.53 |
| 3,721,033 A * | 3/1973 | Haynes | 43/17.6 |
| 3,908,040 A * | 9/1975 | Dauksys | 427/58 |
| 3,940,868 A * | 3/1976 | Northcutt | 43/17.6 |
| 4,085,538 A * | 4/1978 | Jankowski | 43/17.6 |
| 4,114,305 A | 9/1978 | Wohlert | |
| 4,155,192 A | 5/1979 | Varaney | |
| 4,227,331 A * | 10/1980 | Ursrey et al. | 43/17.6 |
| 4,250,650 A * | 2/1981 | Fima | 43/17.6 |
| 4,287,105 A * | 9/1981 | Rosler et al. | 523/400 |
| 4,347,681 A * | 9/1982 | Fima | 43/17.6 |
| 4,440,883 A * | 4/1984 | Pammer | 523/402 |
| 4,520,588 A | 6/1985 | Hindermyer | |
| 4,589,223 A * | 5/1986 | Hastings | 43/42.53 |
| 4,638,584 A | 1/1987 | Lindsay | |
| 4,663,102 A * | 5/1987 | Brenman et al. | 264/222 |
| 4,681,718 A * | 7/1987 | Oldham | 264/102 |
| 4,697,374 A * | 10/1987 | Simms | 43/17.5 |
| 4,774,434 A * | 9/1988 | Bennion | 362/103 |
| 4,799,327 A * | 1/1989 | Treon | 43/17.6 |
| 4,805,339 A * | 2/1989 | Fuentes et al. | 43/42.31 |
| 4,811,513 A * | 3/1989 | Grobl | 43/17.6 |
| 4,826,896 A * | 5/1989 | Procter | 264/272.11 |
| 4,850,131 A * | 7/1989 | Standish, Jr. | 43/42.53 |
| 5,054,778 A * | 10/1991 | Maleyko | 362/190 |
| 5,066,011 A * | 11/1991 | Dykstra et al. | 362/809 |
| 5,157,857 A * | 10/1992 | Livingston | 43/17.6 |
| 5,159,773 A * | 11/1992 | Gentry et al. | 43/17.6 |
| 5,162,696 A * | 11/1992 | Goodrich | 362/800 |
| 5,175,951 A * | 1/1993 | Fruchey | 43/17.6 |
| 5,203,560 A * | 4/1993 | Wang | 264/275 |
| 5,241,457 A * | 8/1993 | Sasajima et al. | 362/503 |

(Continued)

FOREIGN PATENT DOCUMENTS

DE    19512031 A1 * 10/1996

(Continued)

*Primary Examiner*—Darren W. Ark
(74) *Attorney, Agent, or Firm*—David E Herron, II

(57) ABSTRACT

The invention is a soft-bodied fishing lure, and a method of making the same.

8 Claims, 4 Drawing Sheets

U.S. PATENT DOCUMENTS

| | | | | |
|---|---|---|---|---|
| 5,392,555 A * | 2/1995 | Tingey | ....................... | 43/17.6 |
| 5,461,815 A * | 10/1995 | Rodgers | ..................... | 43/17.6 |
| 5,528,474 A * | 6/1996 | Roney et al. | ............... | 362/545 |
| 5,697,182 A * | 12/1997 | Rodgers | ..................... | 43/17.6 |
| 5,758,450 A | 6/1998 | Young | | |
| 5,909,915 A * | 6/1999 | Okuda | ........................ | 361/784 |
| 5,946,847 A * | 9/1999 | North | ........................ | 43/42.31 |
| 5,946,848 A * | 9/1999 | Ysteboe et al. | ............ | 43/42.53 |
| 6,029,388 A | 2/2000 | Yokogawa | | |
| 6,079,144 A * | 6/2000 | Morgan et al. | ............... | 43/17.6 |
| 6,108,962 A * | 8/2000 | Barron | ....................... | 43/17.6 |
| 6,205,697 B1 * | 3/2001 | Kent | ........................ | 43/42.53 |
| 6,257,995 B1 * | 7/2001 | Schrimmer et al. | ......... | 473/353 |
| 6,301,823 B1 * | 10/2001 | Monticello et al. | ........ | 43/42.24 |
| 6,336,288 B1 * | 1/2002 | Foss | ............................ | 43/17.6 |
| 6,485,169 B1 * | 11/2002 | Ragner | ...................... | 362/500 |
| 6,595,671 B1 * | 7/2003 | Lefebvre et al. | ............ | 362/545 |
| 6,647,659 B1 * | 11/2003 | King et al. | ................... | 43/17.6 |
| 6,732,469 B1 * | 5/2004 | Lindgren | .................... | 43/17.5 |
| 6,807,766 B1 * | 10/2004 | Hughes et al. | ............... | 43/17.6 |
| 6,912,808 B1 * | 7/2005 | Mak | .......................... | 43/42.24 |
| 6,922,935 B1 * | 8/2005 | Yu | ............................. | 43/17.6 |
| 2002/0030992 A1 * | 3/2002 | Lefebvre et al. | ............ | 362/243 |
| 2003/0182841 A1 * | 10/2003 | Calak et al. | ................. | 43/17.6 |
| 2004/0200122 A1 * | 10/2004 | Aanenson et al. | ........... | 43/17.6 |
| 2006/0016117 A1 * | 1/2006 | Aanenson | ................. | 43/42.31 |

FOREIGN PATENT DOCUMENTS

| | | | |
|---|---|---|---|
| FR | 2417420 A1 * | 7/2004 | |
| GB | 2158682 A * | 11/1985 | |
| GB | 2322530 A * | 9/1998 | |
| GB | 2333431 A * | 7/1999 | |
| JP | 2004-261046 A * | 9/2004 | |
| WO | WO-2005/065451 A1 * | 7/2005 | |

* cited by examiner

LIGHTED FISHING LURE

The invention is a soft-bodied fishing lure, as well as a method for making the same. This application claims domestic priority based upon provisional application Ser. No. 60/626,331 filed Nov. 9, 2004, and is hereby incorporated by reference as if set forth herein.

SUMMARY OF THE INVENTION

THE INVENTIVE FISHING LURE

The invention is a soft-bodied fishing lure having an electronics component that includes a printed circuit board, a battery, and a battery cage configured to retain the battery and maintain the battery in electrical communication with the printed circuit board. The electronics component of the fishing lure will also include at least one light emitting diode attached to the circuit board, and a membrane switch configured to enable selective activation of the at least one light emitting diode.

The soft-bodied fishing lure will also comprise a translucent plastisol enveloping the electronics component. The plastisol should form the shape of a fish bait, such as a minnow, lizard, crayfish, frog, or the like.

Optionally, the fishing lure may have a fish hook having a barb end located exterior the plastisol and a shaft that passes through the plastisol. In this embodiment, the electronics component is attached to the shaft. In a preferred embodiment, the electronics component may be soldered to the shaft of the hook.

The invention may also include a gate switch configured to rapidly flash the at least one light emitting diode. Also, the plastisol may include a mixture of dimethyl siloxane and trimethylated silica.

In a preferred embodiment of the invention, the soft bodied fishing lure will include two light emitting diodes. In this embodiment, the invention may also include a gate switch that is configured to alternately flash the light emitting diodes. Preferably, the light emitting diodes comprise different colors, one being red.

The electronics component of the soft bodied fishing lure may further comprise a layer of epoxy coating the battery and the battery cage, and may further assist in adhering the battery cage to the circuit board. Additionally, the electronics component may further include a timer configured to deactivate the at least one light emitting diode a pre-selected amount of time following activation.

THE INVENTIVE METHOD

The invention is also a method of making a fishing lure comprising the steps of creating an electronics component by providing a printed circuit board, a battery, and a battery cage. The inventive method will also include the step of configuring the battery cage to retain the battery and maintain the battery in electrical communication with the printed circuit board. The inventive method will also include the step of attaching at least one light emitting diode to the circuit board, and positioning a gate switch in electrical communication with the circuit board, thereby enabling selective activation of the at least one light emitting diode.

The invention will also include the step of enveloping the electronics component within a translucent plastisol, and forming the plastisol into the shape of fish bait.

In an alternate embodiment of the inventive method, the invention will include the steps of creating a mold bearing the shape of a fish bait, and then pouring the plastisol into the mold. Of course, this embodiment of the method may also include the step of allowing the plastisol to cure into the body of a soft-bodied fishing lure.

In order to ensure that the electronics component is contained within the plastisol, and remains enveloped by the plastisol, the inventive method may include the step of pouring a portion of plastisol into the mold until the mold is only partly full, then placing the electronics component within the mold and allowing the portion of plastisol to at least partly cure. In this embodiment, the invention will include the step of filling the rest of the mold with plastisol.

The inventive method may also include the step of treating the electronics component with an epoxy resin, and adhering the battery cage to the circuit board additionally, the inventive method may also include the steps of positioning a barb of the fish hook exterior the plastisol, and passing the shaft of a fish hook through the plastisol and attaching the electronics component to the shaft of the hook.

DETAILED DESCRIPTION OF THE PREFERRED EMBODIMENTS

Figure 1:
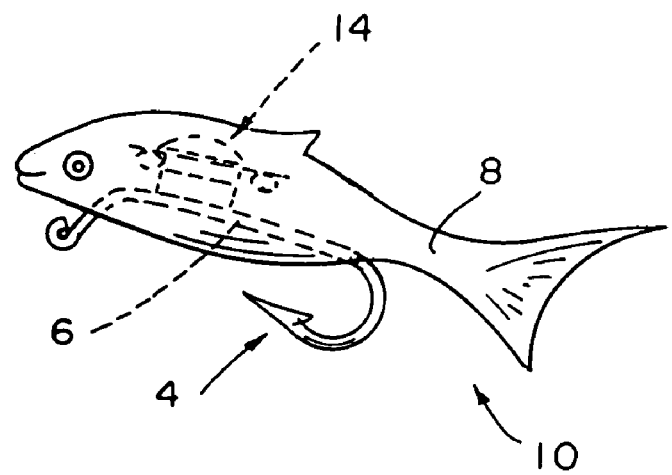
FIG. 1 is a perspective view showing a first embodiment of the soft-bodied fishing lure, according to the principles of the invention.

FIG. 1 shows a perspective view detailing a first preferred embodiment of the soft-bodied fishing lure 10. The fishing lure 10 includes a fish hook 2 having a barb 4 positioned exterior a plastisol body 8. In this embodiment, the body 8 forms a shape of a bait fish, such as a minnow or shad. Positioned within the body 8 is an electronics component 14, which may be adhered to the shank 6 of the hook 2.

Figure 2:
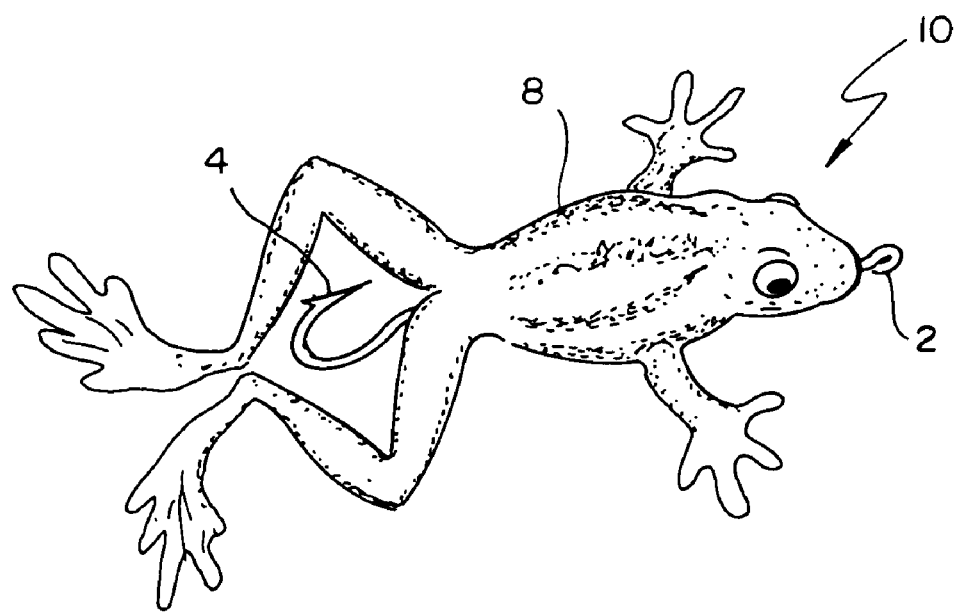
FIG. 2 is a perspective view showing an alternate embodiment of the soft-bodied fishing lure, according to the principles of the invention.

FIG. 2 shows a second preferred embodiment of the soft-bodied fishing lure 10. In this embodiment, the lure 10 comprises a plastisol body 8 forming the shape of a frog, and has a hook 2 passing through the body.

Figure 3:
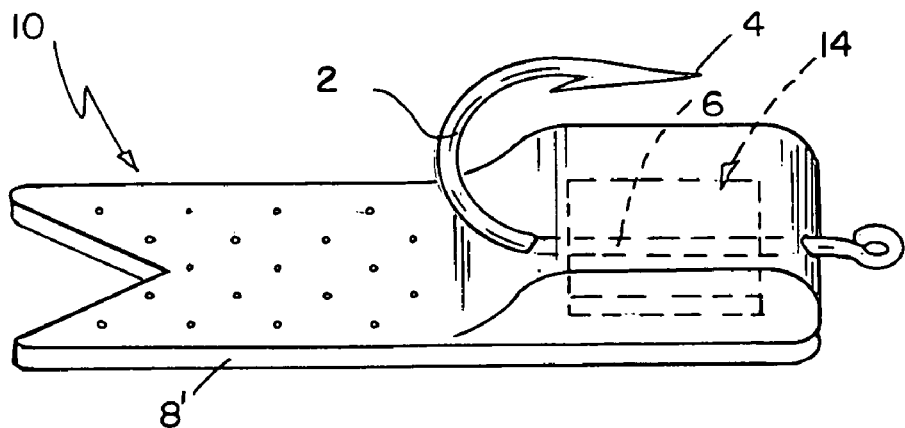
FIG. 3 is a perspective view showing an alternate embodiment of the soft-bodied fishing lure, according to the principles of the invention.

FIG. 3 shows a third preferred embodiment of the fishing lure 10, comprising a plastisol body 8 and a hook 2 passing through at least a portion of the body 8. The barb 4 of the hook 2 is positioned exterior of the body 8, and the electronics component 14 is enveloped entirely within the body. In this embodiment, the electronics component 14 is adhered to the shank 6 portion of the hook 2.

Figure 4:
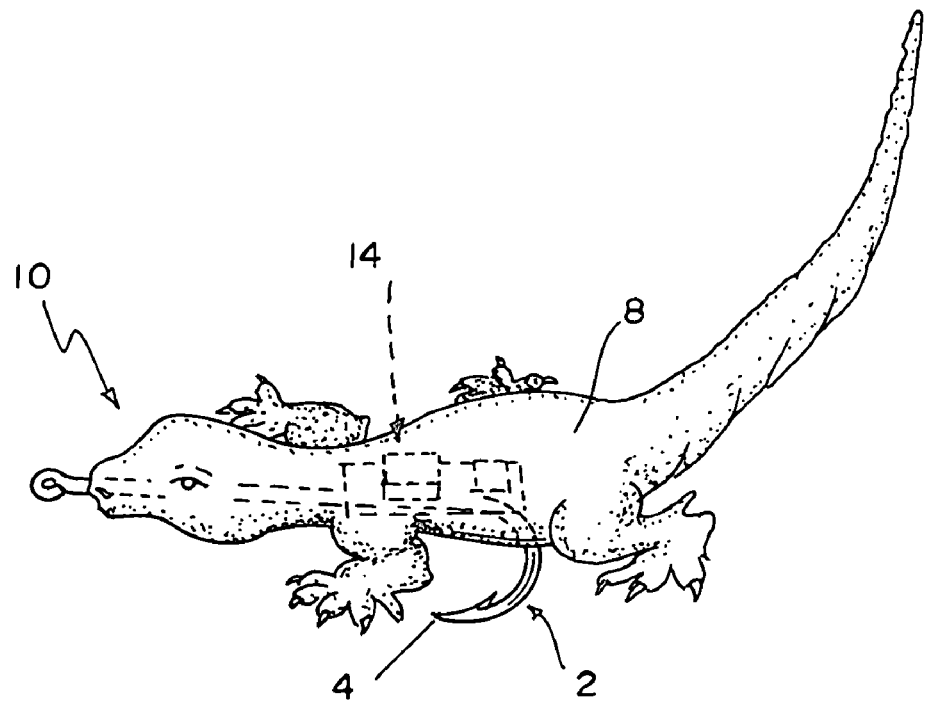
FIG. 4 is a perspective view showing an alternate embodiment of the soft-bodied fishing lure, according to the principles of the invention.

FIG. 4 shows a fourth preferred embodiment of the lure 10, having a body 8 forming the shape of a lizard. The body 8 partly encloses a hook 2 having its barb 4 protruding exterior the body 8. An electronics component 14 is enveloped entirely within the belly of the body 8 of the lizard, and is attached to a portion of the hook. Of course, the electronics component 14 may be attached to the hook by soldering, or by epoxy, or may be mutually enclosed within the plastisol body 8.

Figure 5:
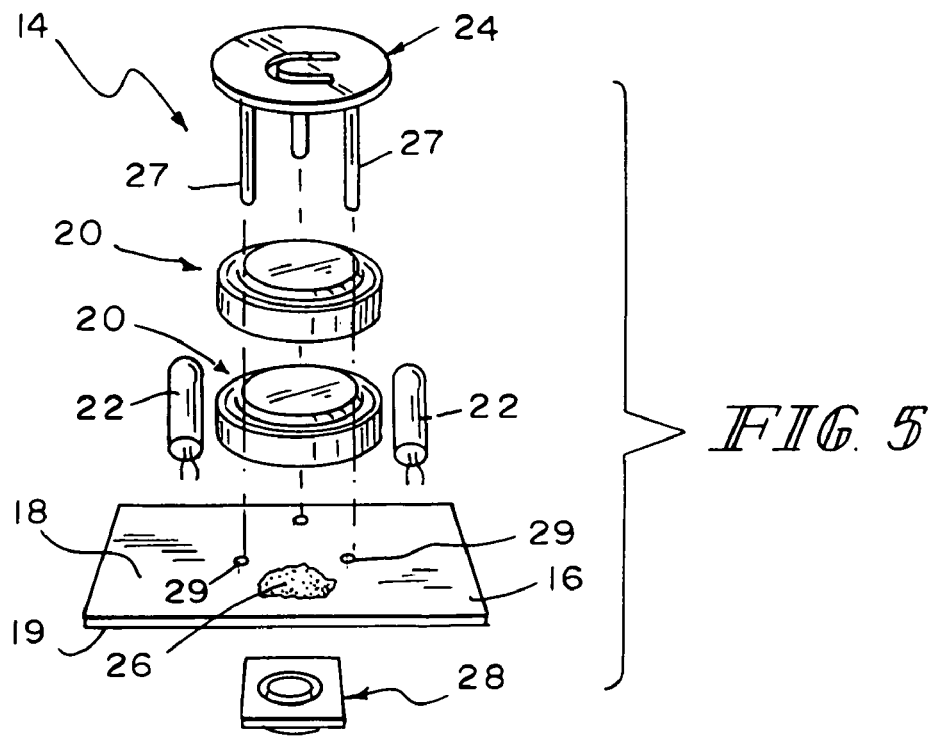
FIG. 5 shows a first preferred embodiment of the electronics component of the soft-bodied fishing lure, according to the principles of the invention.

FIG. 5 shows an exploded, perspective view of a first preferred embodiment of the electronics component 14. The electronics component 14 will comprise a circuit board 16, at least one battery 20 and a battery cage 24 positioned to maintain the battery 20 in proper electrical communication with the circuit board 16. At least one LED 22 or light emitting diode (LED) will also be in contact with the circuit board 16.

Still referring to FIG. 5, an epoxy resin 26 may be used to adhere the batteries 20 and battery cage 24 to a first face 18 of the circuit board 16. In this embodiment, a membrane switch 28 is positioned on a second face 19 of the circuit board 16. The membrane switch 28 is configured to enable selective activation of the light emitting diode 22.

Still referring to FIG. 5, it is preferred that the plastisol body 8 (not shown in FIG. 5, viewable in FIG. 1–4) a translucent or transparent plastisol, such as a mixture of dimethyl siloxane and trimethylated silica, thereby enabling the LED 22 to create a visible visual effect attractive to fish.

Still referring to FIG. 5, the electronics component 14 preferably comprises a pair of LEDs 22. In a preferred embodiment, the LEDs 22 are of different colors, and preferably one LED 22 is red. The electronics component 14 may also include a gate switch or chip configured to flash LEDs 22, thereby enhancing the fish-attractive aspects of the lure.

As shown in FIG. 5, the epoxy resin 26 is presented by a dollop positioned on the first face 18 of the circuit board 16. Alternatively, the epoxy resin 26 may envelop the entire electronics component 14, thereby holding all of its components parts together. In another embodiment, the circuit board 16 is configured with a plurality of holes 29 that are cooperatively configured and positioned to receive respective ends of legs 27 of the battery cage 24. In this embodiment, the legs 27 may pass through the holes 29, and either be folded over the circuit board 16, soldered to the circuit board 16, or may even form a unitary structure with the board.

Still referring to FIG. 5 the battery 20 is shown to comprise a pair of individual batteries. Of course, the battery component 20 may include a single cell positioned within the battery cage 24. It is preferred to use a small battery, such as a standard watch battery; however, other designs or battery embodiments are certainly within the scope and breadth of the invention.

Figure 6:
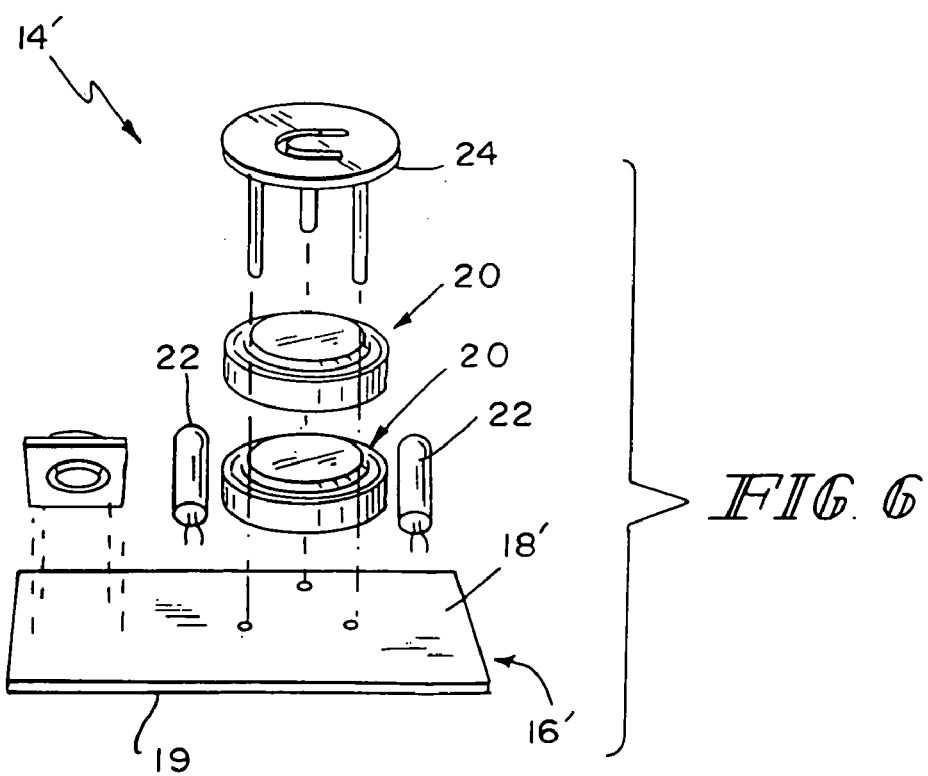
FIG. 6 shows a second preferred embodiment of the electronics component of the soft-bodied fishing lure, according to the principles of the invention.

FIG. 6 shows an alternate embodiment of the electronics component 14' this second preferred embodiment of the electronics component 14' includes a circuit board 16' having a first face 18' and a second face 19. In this embodiment, however, the battery 20, LED 22, battery cage 24, and membrane switch 28 are all positioned on the first face 18' of the circuit board 16' it should be noted that this particular embodiment of the electronics component 14' is more elongated than the first preferred embodiment shown in FIG. 5. Its elongated form, however makes this embodiment of electronics component 14' better-suited for a more elongated, skinny plastisol body, such as the lizard (as shown in FIG. 4), or a snake, or a traditional plastic worm. The invention may include the steps of pour molding plastisol into a mold, or alternatively may include an injection molding technique.

Figure 7:
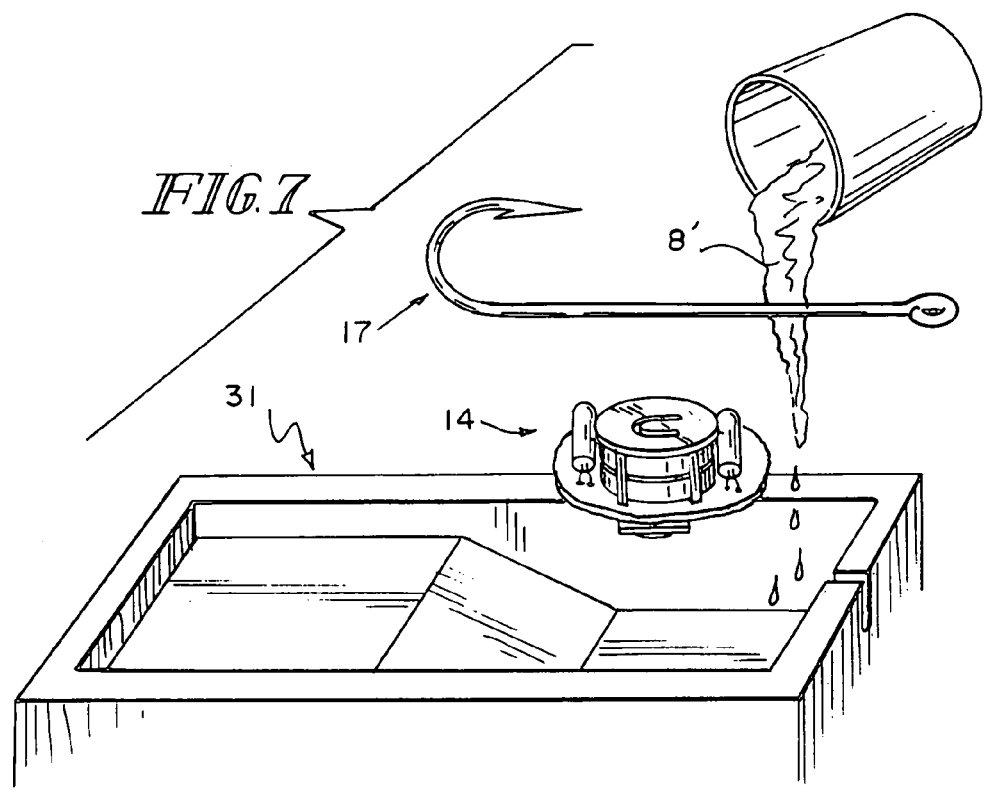
FIG. 7 shows a perspective view showing the method of making a fishing lure, according to the principles of the invention.

FIG. 7 shows a perspective view that details the method of pour-molding the liquid plastisol 8' into a mold 31. First, a quantity of plastisol 8' in liquid or gelatinous form is poured into the interior portion of the mold 31. The electronics component 14 and a hook 17 will also be placed into the mold 31. Optionally, the hook 17 may be attached or affixed to the electronics component 14 by any known method, such as epoxy or soldering.

Figure 8:
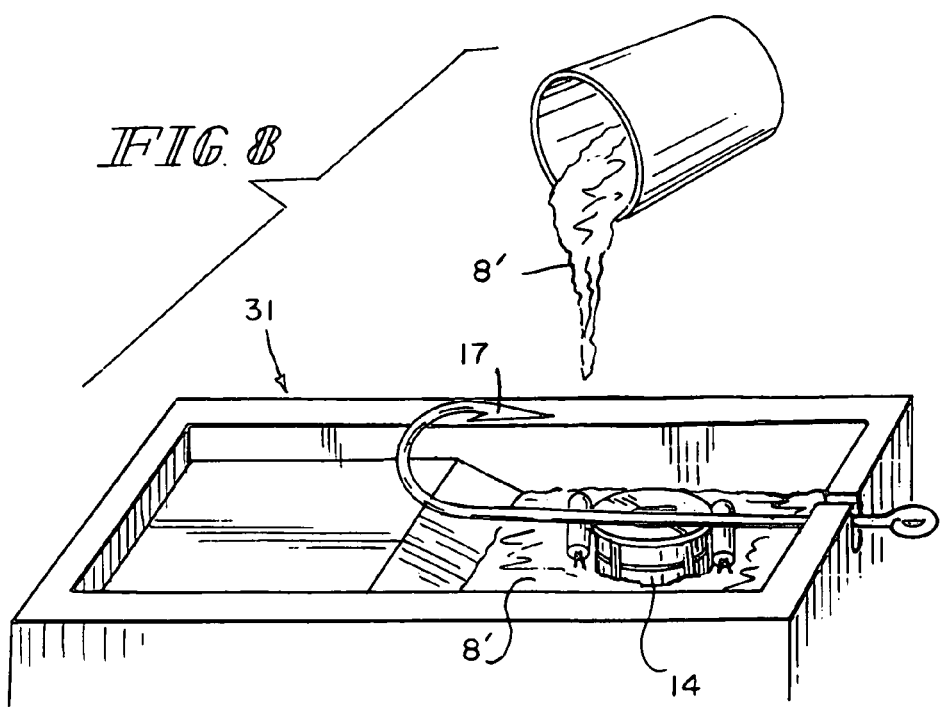
FIG. 8 shows a second perspective view showing the method of making a fishing lure.

As shown in FIG. 8, the plastisol 8' is poured into the mold 31 to a selected depth, then the electronics component 14 and hook are placed into the mold 31 and inserted into the liquid-form plastisol 8'. Because it is important that the plastisol 8' completely envelop and protect the electronics component, it is important that the electronics component 14 and hook 17 both be inserted into the mold 31 after pouring has begun.

Still referring to FIG. 8, the electronics component 14 and hook are then placed into the plastisol 8' so that at least a portion of the electronics component 14 is beneath the surface of the gelatinous plastisol 8'. In FIG. 8, the electronics component 14 and hook 17 are partly submerged beneath the surface of the plastisol 8' within the mold so that the battery cage 24 of the electronics component protudes above the poured plastisol, but is beneath a top edge of the mold 31. Next, the mold 31 is failed with plastisol 8' so that the electronics component 14 will be completely enveloped within the plastisol 8', and at least a portion of the shaft of the hook 17 will be encased within the plastisol 8 covering when the lure is removed from the mold after curing.

Having described the invention and the drawings in detail, it is understood that the descriptions were for illustrative purposes only. The scope and breadth of the invention shall be limited only by the appended claims.

I claim:

1. A soft-bodied fishing lure, comprising:
    an electronics component having a printed circuit board, a battery, and a battery cage that is configured to maintain the battery in direct contact with the printed circuit board;
    at least one light emitting diode attached to the circuit board;
    a gate switch in electrical communication with the circuit board and configured to enable selective activation of the at least one light emitting diode;
    a plastisol forming a pliable, unitary body that envelops the electronics component; and
    a fish hook having a barb end located exterior the plastisol, and a shaft passing through the plastisol and attached to the electronics component.

2. The soft-bodied fishing lure as in claim 1, wherein the plastisol comprises a mixture of dimethyl siloxane and trimethylated silica.

3. The soft-bodied fishing lure as in claim 1, wherein the at least one light emitting diode includes two light emitting diodes.

4. The soft-bodied fishing lure as in claim 3, wherein the gate switch is configured to alternately flash the two light emitting diodes.

5. A method of making a soft-bodied fishing lure, the method comprising the steps of:
    creating an electronics component by:
        providing a printed circuit board, a battery, and a battery cage;

configuring the battery cage to retain the battery and maintain the battery in direct contact with the printed circuit board;

attaching at least one light emitting diode to the circuit board;

positioning a gate switch in electrical communication with the circuit board to enable selective activation of the at least one light emitting diode;

forming the plastisol into a shape of a fish bait, the step of forming further including the steps of:

providing a mold;

positioning a fish hook so that at least a portion of a shaft of the hook is inside the mold;

enveloping the electronics component within a pliable plastisol by pouring the plastisol into the mold so that the plastisol envelops the electronics component and the portion of the shaft of the hook; and, positioning a barb of the fish hook exterior the plastisol.

6. The method as in claim 5, further comprising the step of allowing the plastisol to cure into a pliable, soft body.

7. The method as in claim 5, the forming step further including the steps of:

pouring a portion of the plastisol into the mold until the mold is only partly full;

placing the electronics component within the mold;

allowing the portion of plastisol to at least partly cure; and, filling the mold with another portion of the plastisol.

8. The method as in claim 7, further comprising the steps of treating the electronics component with an epoxy resin; and adhering the battery cage to the circuit board.

* * * * *